(12) United States Patent
Choi et al.

(10) Patent No.: US 8,151,342 B2
(45) Date of Patent: Apr. 3, 2012

(54) CONTENTS EXECUTION DEVICE EQUIPPED WITH INDEPENDENT AUTHENTICATION MEANS AND CONTENTS RE-DISTRIBUTION METHOD

(75) Inventors: Bum Suk Choi, Daejeon (KR); Sang Hyun Joo, Daejeon (KR); Hye Joo Lee, Daejeon (KR); Jin Soo Choi, Daejeon (KR); Jin Woo Hong, Daejeon (KR)

(73) Assignee: Eletronics and Telecommunications Research Institute, Daejeon (KR)

( * ) Notice: Subject to any disclaimer, the term of this patent is extended or adjusted under 35 U.S.C. 154(b) by 878 days.

(21) Appl. No.: 11/722,215

(22) PCT Filed: Jan. 26, 2006

(86) PCT No.: PCT/KR2006/000308
§ 371 (c)(1),
(2), (4) Date: Jun. 20, 2007

(87) PCT Pub. No.: WO2006/080814
PCT Pub. Date: Aug. 3, 2006

(65) Prior Publication Data
US 2009/0077652 A1    Mar. 19, 2009

(30) Foreign Application Priority Data

Jan. 26, 2005  (KR) .................. 10-2005-0007143
Jan. 25, 2006  (KR) .................. 10-2006-0007634

(51) Int. Cl.
*G06F 21/00*    (2006.01)

(52) U.S. Cl. ................ 726/16; 726/19; 726/9; 380/200; 380/201; 380/229

(58) Field of Classification Search .................. None
See application file for complete search history.

(56) References Cited

U.S. PATENT DOCUMENTS 6,055,314 A * 4/2000 Spies et al. ................ 380/228
(Continued)

FOREIGN PATENT DOCUMENTS

CN    1317202 A    10/2001
(Continued)

OTHER PUBLICATIONS

European Search Report: EP06715761.
(Continued)

*Primary Examiner* — Nasser Moazzami
*Assistant Examiner* — Fikremariam A Yalew
(74) *Attorney, Agent, or Firm* — Ladas & Parry LLP

(57) ABSTRACT

The present invention particularly relates to a digital content providing service method and a content execution device for the same, for maximizing user convenience and maintaining a sufficient level of security using a smart card. The inventive content execution device includes an independent authentication unit for storing a tool necessary for executing content; an authentication support module for providing a data communication channel between the smart card and an external broadcasting server; a tool agent for calling the tool stored in the independent authentication unit; and a content execution unit for executing content data received from the external broadcasting server. The content execution device included in a content authority management system of the present invention employs the smart card for user authentication and/or content playing tool management. Accordingly, a user can freely executing his/her licensed content in different content execution devices by conveniently removing and reinserting the smart card, without separate measures. Moreover, according to the present invention, a user can effectively use content from different broadcasters.

7 Claims, 5 Drawing Sheets

U.S. PATENT DOCUMENTS

| | | | |
|---|---|---|---|
| 7,167,841 B2 | 1/2007 | Hatano et al. | |
| 7,299,362 B2 * | 11/2007 | Shen et al. | 713/189 |
| 7,404,082 B2 * | 7/2008 | Medvinsky et al. | 713/168 |
| 7,571,328 B2 * | 8/2009 | Baumert et al. | 713/192 |
| 2003/0018582 A1 | 1/2003 | Yaacovi | |
| 2003/0225701 A1 | 12/2003 | Lee et al. | |
| 2004/0030930 A1 | 2/2004 | Nomura | |
| 2004/0039916 A1 * | 2/2004 | Aldis et al. | 713/177 |
| 2004/0086127 A1 | 5/2004 | Candelore | |

FOREIGN PATENT DOCUMENTS

| | | |
|---|---|---|
| EP | 1282315 | 2/2003 |
| EP | 1459538 | 9/2004 |
| JP | 2001-283071 A | 10/2001 |
| JP | 2002-163141 A | 6/2002 |
| JP | 2004-005365 A | 1/2004 |
| JP | 2005-151347 | 6/2005 |
| KR | 1020050001124 A | 1/2005 |
| KR | 102005 0028117 | 3/2005 |
| KR | 102005 0063860 | 6/2005 |
| WO | 03/056823 A1 | 7/2003 |

OTHER PUBLICATIONS

SM Shen, et al; "IPMP Tools Management Function for MPEG-n-IPMP System", International Organisation For Standardization Organisation Internationale Normalisation ISO/IEC JTC1/SC29/WG11 Coding of Moving Pictures and Audio ISO/IEC JTC1/SC29/WG11 m7153 Singapore-Mar. 2001, 8 pages.

* cited by examiner

[Figure 2]
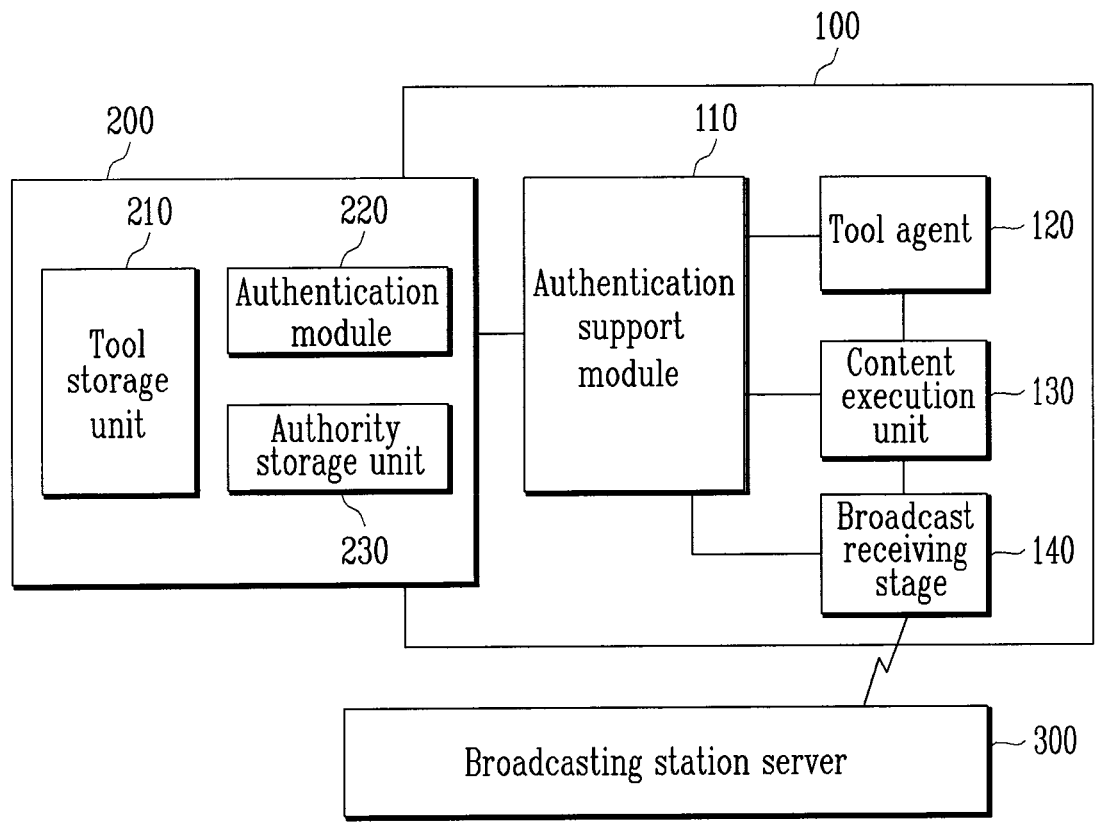
[Figure 3]
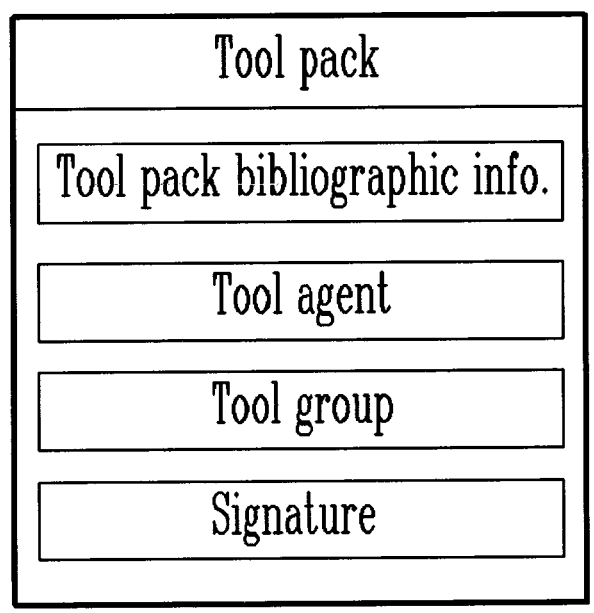

[Figure 4]
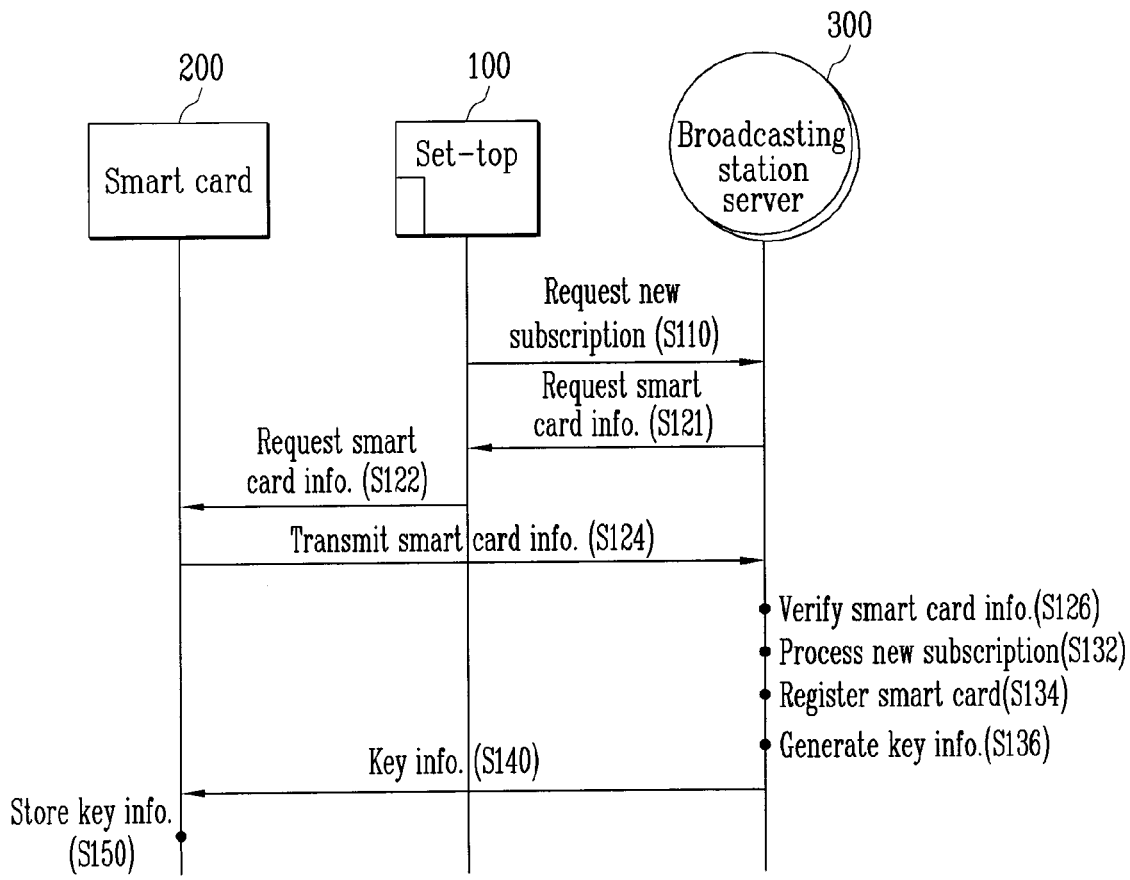
[Figure 5]
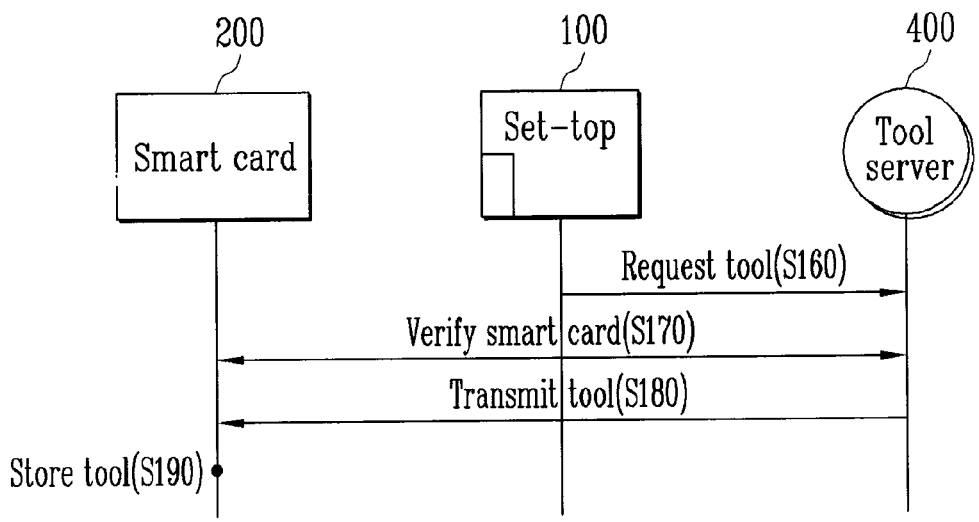

[Figure 6]
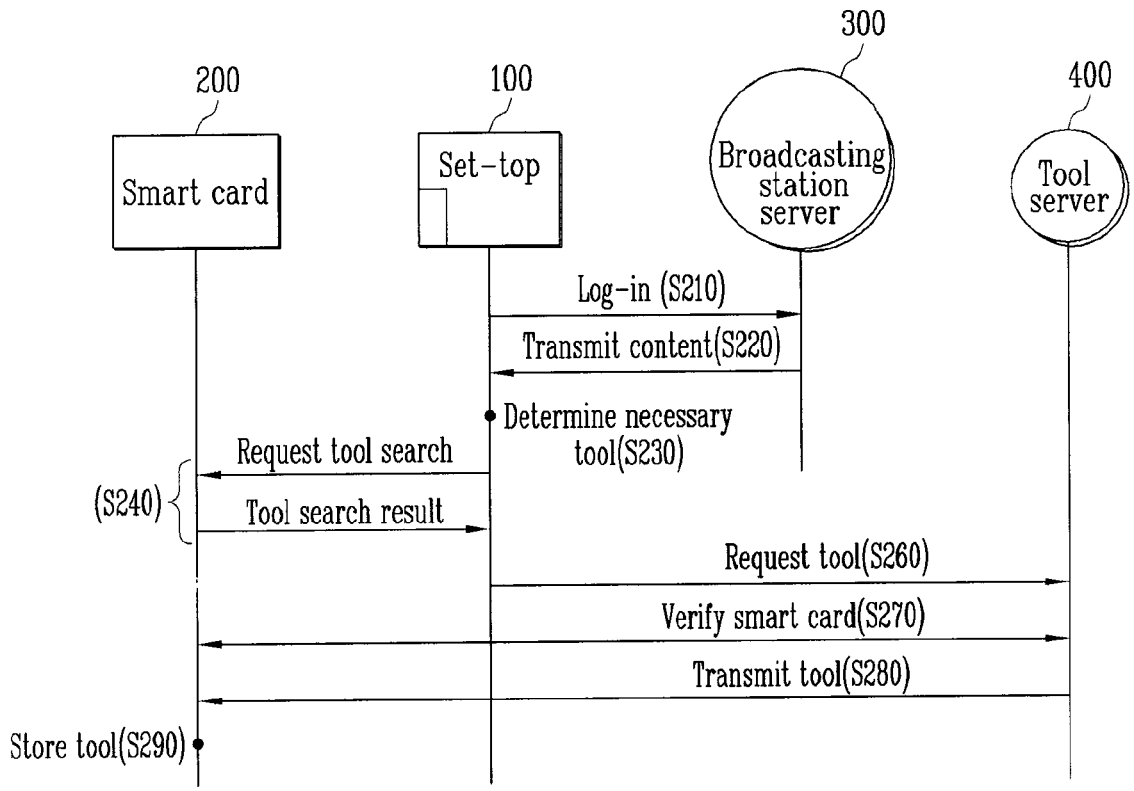
[Figure 7]
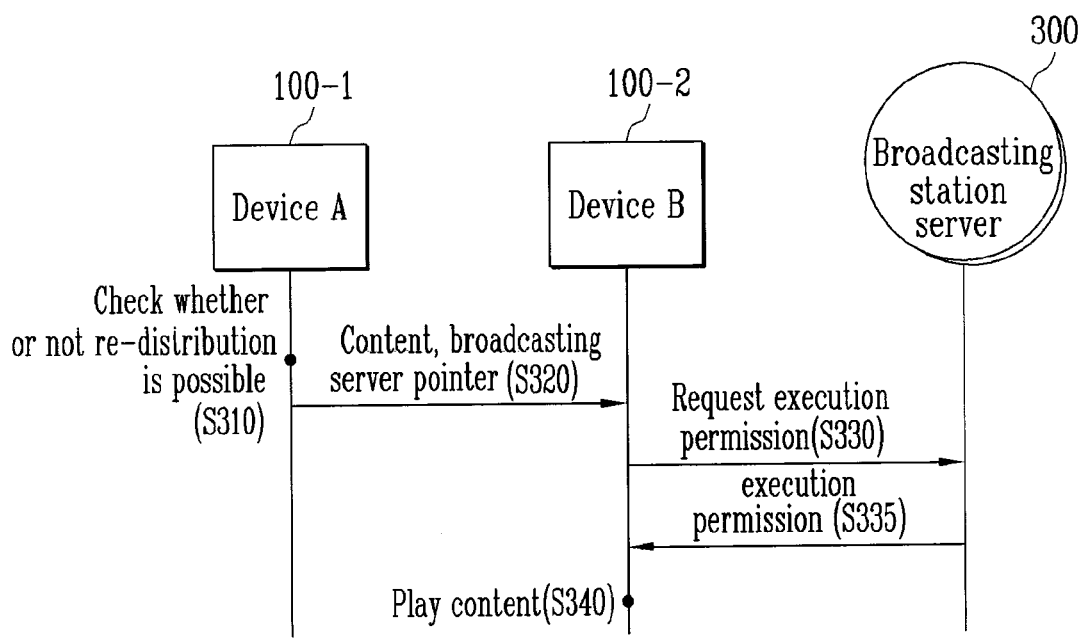

[Figure 8]
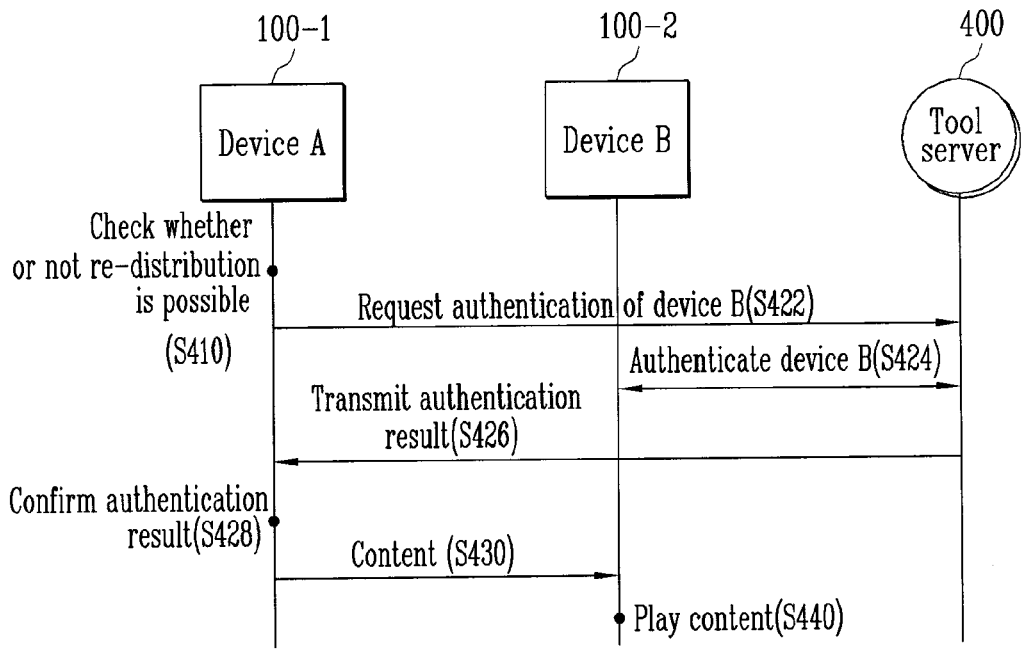
[Figure 9]
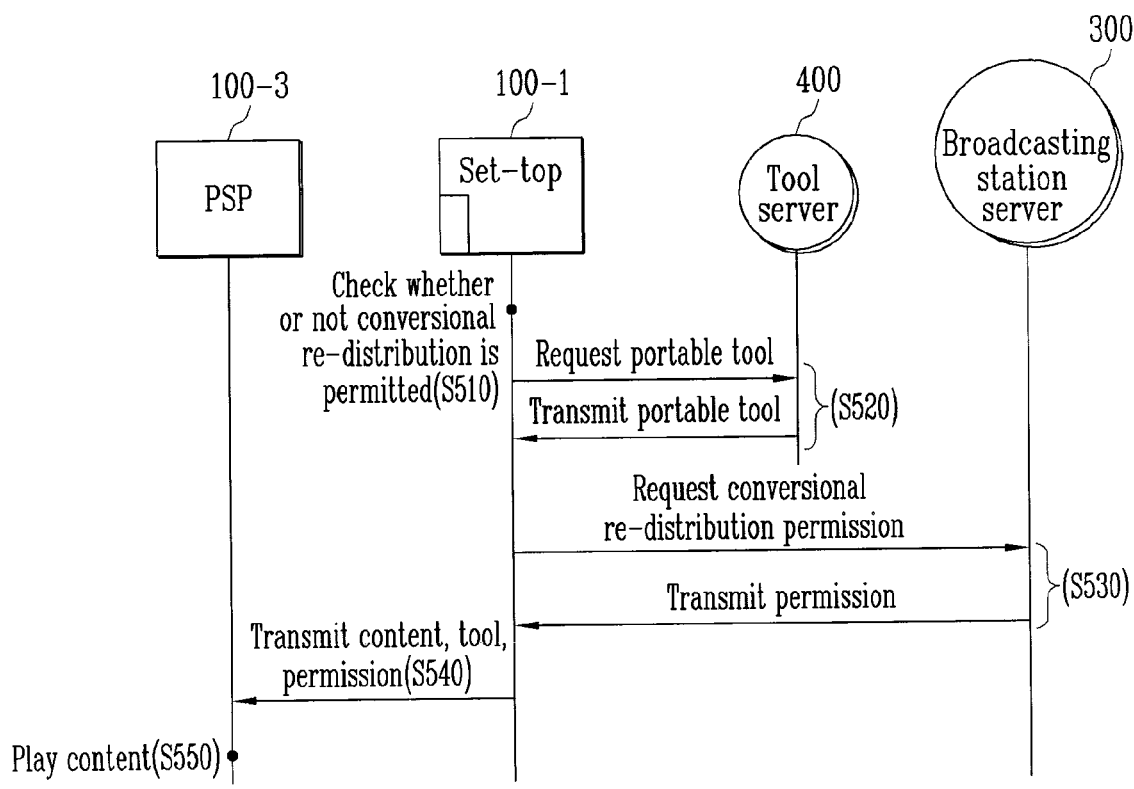

CONTENTS EXECUTION DEVICE EQUIPPED WITH INDEPENDENT AUTHENTICATION MEANS AND CONTENTS RE-DISTRIBUTION METHOD

TECHNICAL FIELD

The present invention relates to a content providing service method used in digital broadcasting and a content execution device for the same, and more particularly, to a digital content providing service method and a content execution device for the same which maximize user convenience and maintain a sufficient security level using a smart card.

BACKGROUND ART

Digital content is of excellent quality and quite convenient to manage compared to conventional analog content. However, since digital content can be copied an unlimited number of times, the danger and possible extent of infringement are great. In particular, in digital broadcasting, it is well known that when easy-to-copy digital content is provided to many subscribers, wide scale copyright infringement results. Accordingly, as protection of digital content is rapidly regarded as being of great importance to the development of digital industries, various formats of digital rights management (DRM) have been developed.

As broadcasting service is digitalized, a slightly improved protection mechanism is required. A conventional conditional access system (CAS) cannot guarantee the security of broadcast content in emerging broadcasting business models. For example, it cannot guarantee protection of broadcast content from recording and re-distribution.

In a conventional broadcasting system, each of broadcasting station servers (broadcasters) uses its own specific protection mechanism for a broadcasting service, and does not have a protection mechanism compatible with other broadcasting stations. Accordingly, if an end user intends to use a new channel service from other broadcasters, he/she has to change his/her own set-top-box (STB). This is very troublesome and costly to consumers of broadcast content.

Further, in the case where the user replaces his/her set-top-box with another one, he/she should reregister the new set-top-box with each broadcasting station. This results in great inconvenience to the user.

In the meantime, a user lawfully receiving content may wish to use the received content in devices other than a multimedia device used to receive the content, or to re-distribute the received content to other users. However, the conventional art does not permit such varied license distribution. This is a limitation to the user in using the content, and may be an obstacle to the spread of digital content broadcasting.

DISCLOSURE

Technical Problem

The present invention is directed to strengthening of security and/or enhancement of convenience in digital content distribution and management.

The present invention is also directed to a content execution device for conveniently performing an authority authentication procedure using a smart card.

Further, the present invention is directed to a method of efficiently providing a broadcasting service using a smart card, in a broadcasting system having a structure where authentication and tool management roles are separated.

Furthermore, the present invention is directed to a method of efficiently providing broadcasting service using a smart card, in a broadcasting system where a broadcasting content consumer region is specified as a home domain.

Furthermore, the present invention is directed to a method of transmitting lawfully acquired content to other users or devices.

Technical Solution

One aspect of the present invention provides a content execution device including: an independent authentication unit for storing a tool necessary for executing content; a tool agent for calling the tool stored in the independent authentication unit; and a content execution unit for executing content data received from an external broadcasting server.

Another aspect of the present invention provides a content broadcasting service subscription method performed in a content execution device (also, called a user device to emphasize belonging to a broadcasting service user side) and a broadcasting server broadcasting content data, the method including the steps of: in the user device, requesting a broadcasting station server for a new subscription; transmitting information of a user smart card connected to the user device, to the broadcasting station server; in the broadcasting station server, checking the received smart card information; registering the new subscription and the smart card with the broadcasting station server; in the broadcasting station server, transmitting a certificate to the smart card; and in the smart card, storing the certificate in an internal memory.

Yet another aspect of the present invention provides a content execution method performed in a content execution device, the method including the steps of: receiving content from a broadcasting station server; determining a tool necessary for executing the received content; determining whether or not the necessary tool exists in a smart card; connecting to a tool server, and requesting the tool when it does not exist in the smart card; receiving the tool from the broadcasting station server; storing the received tool in the smart card; and executing the content using the tool stored in the smart card.

Yet another aspect of the present invention provides a method for re-distributing content from a content execution device (source device) and to a content execution device (target device), the method including the steps of: checking whether or not re-distribution of the content is permitted; transmitting the content, use tool information, and a point of the broadcasting station server to the target device; in the target device, connecting to the broadcasting station server and requesting permission to execute the content; and receiving the execution permission, and playing the content.

Yet another aspect of the present invention provides a method for re-distributing content performed in a source device and a target device, the method including the steps of: checking whether or not re-distribution of the content is permitted; receiving authentication of the target device from an external broadcasting server; transmitting the content, use tool information, and play permission information to the target device; and in the target device, playing the content.

Yet another aspect of the present invention provides a method for re-distributing content from a source device to a target device performed in the source device, the method including the steps of: checking whether or not re-distribution of the content is permitted; receiving authentication of the target device in an external tool server; and transmitting the content, use tool information, and a pointer of a broadcasting station server holding rights to the content, to the target device.

Yet another aspect of the present invention provides a method for re-distributing content from a source device to a target device performed in the target device, the method including the steps of: receiving the content, use tool information, and a pointer of the broadcasting station server from the source device; connecting to a broadcasting sever holding rights to the content, and requesting permission to execute the content; and receiving execution permission, and playing the content.

Yet another aspect of the present invention provides a method for conversional re-distributing content from a content execution device (source device) to a portable device (target device), the method including the steps of: checking whether or not conversional re-distribution of the content stored in the source device is permitted; requesting a tool server for transmission of a portable device tool (hereinafter, referred to as "portable tool"), and downloading the portable tool; requesting a broadcasting station server for permission to re-transmit the content to the target device, and receiving the permission; transmitting content, portable tool, and the re-transmission permission to a portable device; and in the target device, playing the content using the portable tool, and the re-transmission permission.

Yet another aspect of the present invention provides a method for conversional re-distributing content from a source device to an external target device, the method including the steps of: checking whether or not conversional re-distribution of the content is permitted; requesting an external tool server for transmission of a portable tool, and downloading the portable tool; requesting a broadcasting station server holding rights to the content, for permission to convert and re-distribute the content, and receiving the permission; and transmitting content, a portable tool, and the permission to re-transmit the content to the target device.

Advantageous Effects

As described above, in the present invention, a content execution device included in a content authority management system of the present invention employs the smart card for user authentication and/or content playing tool management. Accordingly, a user can freely execute his/her licensed content in different content execution devices by conveniently removing and reinserting the smart card, without separate measures.

Moreover, according to the present invention, a user can effectively use content from different broadcasters.

Thanks to a content re-distribution method of the present invention, broadcasting non-subscribers also can execute broadcast content within a limited range, thereby fostering widespread, lawful use of broadcast content.

According to the content re-distribution method of the present invention, content protected by a copyright protection device can be executed in different multimedia devices such as a PDA, as well as a content broadcasting receiver, thereby fostering widespread, lawful use of broadcast content.

DESCRIPTION OF DRAWINGS

FIG. 2 is a block diagram illustrating a structure of a content execution device according to an embodiment of the present invention;

FIG. 3 is a block diagram illustrating a structure of a tool pack, which can be applied to a content execution device according to the present invention;

FIG. 4 is a block diagram illustrating a content providing service method according to an embodiment of the present invention;

FIG. 5 is a block diagram illustrating a content service providing method according to another embodiment of the present invention;

FIG. 6 is a block diagram illustrating a content service providing method according to a further embodiment of the present invention;

FIG. 7 is a block diagram illustrating a content re-distribution method according to an embodiment of the present invention;

FIG. 8 is a block diagram illustrating a content re-distribution method according to another embodiment of the present invention; and FIG. 9 is a block diagram illustrating a content re-distribution method according to a further embodiment of the present invention.

Figure 1:
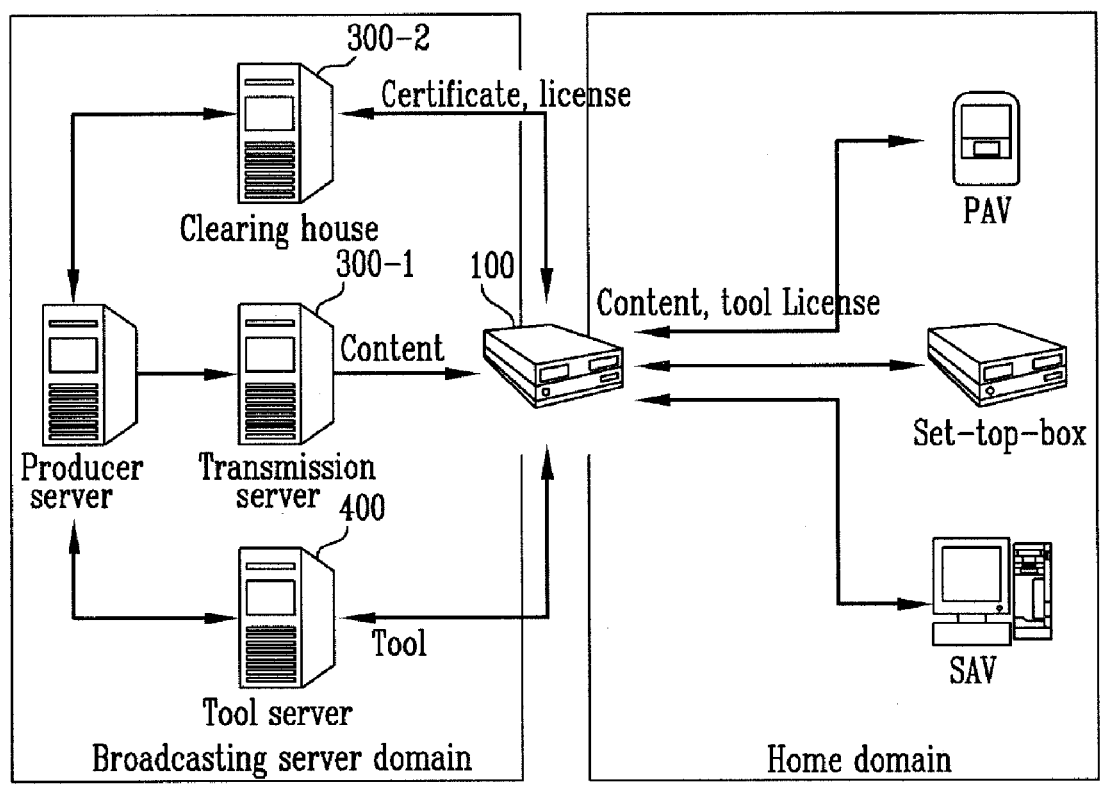
FIG. 1 illustrates a structure of a content broadcasting system capable of employing a content execution device according to the present invention.

* Description of Major Symbols in the above Figures

| | | | |
|---|---|---|---|
| 100 | Content execution device | 110 | Authentication support module |
| 120 | Tool agent | 130 | Content execution unit |
| 140 | Broadcast receiving stage | 200 | Smart card |
| 210 | Tool storage unit | 220 | Authentication module |
| 230 | Authority storage unit | 300 | Broadcasting station server |
| 400 | Tool server | | |

MODE FOR INVENTION

For clarity, a digital content protection/management system capable of employing the present invention will be described. A home domain system of the present invention can be used together with various types of digital content protection/management system. However, since the present invention does not relate to a digital content protection/management system, the present invention will be described with reference to a specific digital content protection/management system.

The broadcast content protection/management system of FIG. 1 includes a producer server of a content provider; a transmission server 300-1 for transmitting content received from the producer server to respective service subscribers; a clearing house 300-2 for authenticating the respective subscribers and/or content; and a tool server 400 for managing tools for encrypting/decrypting content data.

The producer server, which is a server for authoring information for protecting/managing broadcasting content, takes charge of transmitting content information (protection stream) to be protected/managed to the transmission server 300-1 in association with the tool server 400. In other words, the producer server registers content to be broadcasted with the clearing house 300-2, and receives information (e.g. a content ID, a clearing house public key, and a clearing house URL) necessary for distribution. Further, the producer server determines a tool to be applied to the content, and receives tool information (a tool ID and a tool descriptor). In a case where the tool server 400 does not have the tool to be applied, the producer server can also register a new tool and a tool descriptor with the tool server 400 and be allotted a new tool ID. Depending on DMP terminology, the producer server can be operated as CP or SP.

The transmission server 300-1 serves to receive the protection stream from the producer server, and transmit the received protection stream to a domain controller (content execution device 100) of the service subscriber. Depending on the embodiment, the protection stream can be converted to have a predetermined format, and transmitted. Depending on the format embodied, the protection stream can be also converted by the tool registered with the tool server 400. In an embodiment where format conversion is made without using the tool server 400, when the producer server prepares and transmits a syntax file of distribution, tool, and storage information to the transmission server 300, it can also transmit information on the tool to be applied in a separate syntax file in the transmission server 300.

The tool server 400, for managing tools applied to the broadcast content, systematically manages encrypting/decrypting and/or scrambling/descrambling and/or watermarking/fingerprinting tools for the broadcast content. The tool server 400 can include a server for registering the tool, and a server of tool management authority for distributing/managing the tool. The tool server 400 is for downloading the tools stored in a smart card of this embodiment.

The clearing house 300-2, a kind of a server system, takes charge of a function of issuing a license including authority and conditions for controlling use and distribution of broadcast content, a function of billing/payment/settlement based on content use, and a function of user/device/content/domain authentication. The clearing house 300-2 may be an integral authentication system of a broadcasting standard authority for integrally providing digital broadcasting, or may be an authentication system separately provided at each broadcasting station. The clearing house 300-2 registers the smart card, and issues at least one of the necessary security key, key information, and certificate.

The producer server, the clearing house 300-2, the transmission server 300-1, and the tool server 400 belong to a broadcasting server domain that is a collection of authorities forming a broadcasting station, from a user's standpoint. From the standpoint of the content execution device 100 according to this embodiment, the transmission server 300-1 and the clearing house 300-2 of the broadcasting server domain, which are remotely connected to the content execution device 100, are collectively called a broadcasting station server 300, and the tool server 400 and the broadcasting station server 300 are collectively called a broadcasting sever.

The content protection/management system to which the present invention is applied can be used in association with the inventive home domain system having a plurality of content execution devices and/or a plurality of users included in one home domain. In this case, content re-distribution between devices can be content re-distribution between different home domains, and conversional re-distribution of the content can be content re-distribution between the same home domains.

For this, an authentication data storage module of the clearing house 300-2 can have device and/or user information included on a home domain-by-home domain basis, and an authentication execution module can perform a registration procedure for the device and/or the user included on a home domain-by-home domain basis.

In this case, the content execution device of this embodiment can be used as a home domain controller of the home domain system having the plurality of content execution devices and/or the plurality of users included in one home domain. The home domain refers to one home domain controller and groups of users and devices (SAV, PAV) belonging to the home domain controller. One home domain controller defines one home domain, and each home domain includes a plurality of users and devices. It can be embodied that, like a set-top-box receiving digital broadcasting, the home domain controller combines one multimedia player by itself, and can also be embodied to take full charge of only home domain management. As such, the home domain controller performs an important role in defining each home domain and managing each user and/or device. The content execution device of this embodiment is capable of easily and safely performing subscriber authentication using the smart card and has features suitable to its role as the home domain controller.

Hereinafter, a preferred embodiment of the present invention will be described in detail with reference to the accompanying drawings. This embodiment is provided only for example and not intended to limit the scope of the present invention.

The content execution device of FIG. 2 is an exemplary embodiment where an independent authentication module is embodied as the smart card, and includes an authentication support module 110 for providing a user authentication channel between the connected smart card 200 and the external broadcasting station server 300; a tool agent 120 for calling the tools stored in the connected smart card 200; and a content execution unit 130 for executing content data received from the external broadcasting station server 300.

The authentication smart card 200 connected to the content execution device 100 of this embodiment is comprised of a smart chip having an embedded central processing unit (CPU) and a storage memory (EEPROM). And, in terms of constituent elements of the present invention, the authentication smart card 200 includes a tool storage unit 210 for storing tools necessary for playing the content; an authority storage unit 230 for storing authority information on an external broadcasting server; and an authentication module 220 for performing mutual authentication for the external broadcasting server.

The smart card 200 can also be embodied as an RF card employing an RF wireless communication method, but is preferably embodied using a contact type card employing a contact pad communication method in order to secure stable connection with the content execution device 100.

The authentication support module 110 can include a contact type terminal for contacting the contact type smart card, and a smart card interface module for converting data to or from a serial communication format for the smart card.

The content execution unit 130 and the tool agent 120 can be concretely embodied by an arithmetic unit such as a CPU included in the content execution device, a program executed by the arithmetic unit, and an arithmetic memory such as a RAM for loading the program. The content execution unit 130 has a similar structure and operation as a general multimedia execution device. However, in the case where a specific tool stored in the smart card 200 is required to play the content, the content execution unit 130 can call the tool agent 120. The tool agent 120 serves to load the tool necessary for executing content data, from the tool storage unit 210 of the smart card 200, and execute the loaded tool.

The content execution device 100 of this embodiment can further include a broadcast receiving stage 140 for connecting to the external broadcasting station server 300 using a remote communication channel such as the Internet, and performing necessary data communication.

The tool storage unit 210 and the authority storage unit 230 can be embodied by an EEPROM embedded in one chip inside the smart card, and the authentication module 220 can be embodied by a CPU core embedded in one chip inside the smart card and a corresponding program. The smart card can further include a serial communication interface capable of performing serial data communication with the outside (content execution device in this embodiment) through a contact pad. The tool storage unit 210 is for storing tools that are usually distributed only to users permitted by the broadcasting station. The authority storage unit 230 stores identification information of users (to be precise, smart card users) who subscribe to the broadcasting station, and information (e.g. key information, and certificate) necessary for connection (or authentication). Accordingly, a subscriber registered with the broadcasting station and having an issued smart card can execute broadcast content, as long the subscriber has his/her own smart card, according to his/her subscription authority, in any content execution device (however, smart card insertion should be possible) without separate management. The authentication module 220 can hold a security key (a symmetric key method or an asymmetric key method) corresponding to a security key of the external broadcasting server, and its own authenticity can be confirmed through mutual authentication with the broadcasting server. Mutual authentication refers to a smart card authentication method including authentication of the broadcasting server by the smart card, using a feature of the smart card having a self-arithmetic function. Mutual authentication is a technology widely used in the smart card industry.

Meanwhile, the tool agent 120 is more useful in an embodiment employing a content playing software package means of a tool pack structure of FIG. 3.

One example of the tool pack structure is a software and data package, and is constituted of a tool group including bibliographic information of the tool pack; a tool agent that is original data before being loaded as the tool agent of FIG. 2; and tool group possessing at least one tool program activated by the tool agent and processing content data by a predetermined rule. Each type of content data providing service such as public broadcasting or Internet broadcasting has its own separate tool pack. In different embodiments, the tool pack structure may further include a tool pack signature value for guaranteeing its tool pack data packet authenticity (indicating that the data packets were created by an authorized person without forgery or alteration). The tool pack information can include a tool server URL indicating a position of the tool server shown in FIG. 1.

It is desirable for the tool agent make public its specifications such as a call interface and/or a parameter and a return variable, for the convenience of manufacturers of external devices or application programs handling content data encoded by the tool pack. It is desirable that, when the tool pack agent intends to execute the content data needing the tool pack, the content data is previously loaded into the tool agent.

The tool program is for a separate encoding/decoding process. While processing a task that has to be performed, the activated tool agent can call one or more tool programs and authorize the called tool programs to perform the necessary encoding/decoding process. However, it is desirable that, since the tool agent is called by the external device or the application program handling the encoded content data, related manufacturers recognize specifications such as the call interface and/or the parameter, and the return variable for the tool agent. But, since the tool program is called only by the tool agent, in the case where a specification such as a call interface and/or a parameter as well as a return variable for the tool program are protected in private, security of content data conversion can be strengthened without inconveniencing manufacturers of external devices and application programs.

Meanwhile, the plurality of tool programs included in the tool pack may include all private tool programs and all public tool programs used by the tool agent, or may not include a part of the public tool programs. When most frequently used public tool programs in the plurality of tool packs are separately stored, tool pack data storage efficiency can be improved, though the latter alternative provides somewhat weaker security than the former. For this purpose, the latter alternative should include a common tool pack structure that is a collection of one or more tool programs whose execution specifications, such as the call interface and/or the parameter, and the return variable, are open to the public.

Operation of a broadcasting service providing system according to this embodiment will be described with respect to several detailed scenarios.

Scenario I. Subscription to New Broadcasting Service

This scenario is as follows. Broadcasters "A" and "B" use their own protection tools to protect their paid channel services. The respective broadcasters transmit their tool information and tool initialization information together with content. The broadcasters "A" and "B" transmit their protection tools to a tool server of a tool registration authority (TRA). The tool server registers, manages, and transmits a new tool to an end user (device). A user "C" receives the paid channel service from the current broadcaster "A". Further, the user "C" desires to subscribe to a new paid channel service from the broadcaster "B".

As shown in FIG. 4, a method for subscribing to a new broadcaster's content providing service applied in this scenario includes the steps of, in the user device 100, requesting the new subscription from a broadcasting station server 300 of the new broadcaster (S110) and transmitting user information to the broadcasting station server 300 (S124); in the broadcasting station server 300, confirming the received user information (S126), and registering the user's smart card 200 (S132, S134); in the broadcasting station server 300, generating key information (S136) and transmitting the generated key information to the smart card 200 (S140); and in the smart card 200, storing the key information in its internal memory (S150).

The structure shown is embodied using the key information as a certificate stored in the smart card. The key information is used for generating a descrambling key in the smart card 200. In different embodiments, the structure may be more complex, and may use a certificate having a format defined in a separate public authentication authority.

Through the above procedure, the user "C" completes subscription to the new broadcasting service "B". A subscription certificate of the broadcasting service "A" and a subscription certificate of the broadcasting service "B" are stored in the smart card of the user "C" thereby completing the subscription. As such, if the user "C" completing the subscription connects the smart card having the embedded subscription certificate to any device (e.g. set-top-box), he/she can receive broadcast content from a broadcasting server of the broadcaster "B".

However, when the broadcasting server of the broadcaster "B" processes (encodes) and provides content data using its own tools, the user "C" device receiving the content data requires tools for inversely processing (decoding) the received content data. In a subscription-completed state, the user "C" does not have the tools for the content data received form the broadcaster "B". As shown in FIG. 5, a method for acquiring the tools of the broadcaster "B" includes steps of, in the user device 100 connected with the smart card 200, connecting to the tool server 400 and requesting a tool for a specific broadcast (S160); in the tool server 400, verifying the smart card 200 (S170); in the tool server 400, transmitting the tool for the broadcast to the user device 100 (S180); and storing the received tool in the smart card 200 (S190).

The broadcasting station server 300 requested to transmit the broadcast content by the user device 100 transmits the tool information including a tool version to the user device 100 together with the content. In different embodiments, the tool information may further include a seed number for watermark extraction or a key value for decrypting the encrypted content data. The user device 100 receiving the content data confirms whether or not there are the tools corresponding to the tool information received together with the content in its memory or smart card 200. If there are not suitable tools, the above tool downloading process is performed, and if there are the suitable tools, the content is executed (played) using the suitable tool.

Scenario II. Upgrading of Protection Tool

This scenario is as follows. A broadcasting station "A" uses its own protection tool to protect its paid channel service. The broadcasting station "A" has decided to employ a new tool to protect its new service or upgrade a given tool. At present, a user "C" receives the paid channel service from the broadcasting station "A". A content execution device (including smart card) of the user "C" has only an earlier version protection tool and therefore is required to replace it with the new version tool in order to continuously receive the service of the broadcasting station "A" in the future. In a broadcasting station server of the broadcasting station "A", the upgrade-decided (or newly employed) tool is registered with the tool server and, when broadcast content is provided, the tool information including a tool version value is transmitted together with the content.

Methods for the user device to store the upgraded tool in its smart card include a method of connecting to the tool server and receiving the tool, a method of receiving the tool from the broadcasting station server, and a method of connecting to a place indicated by a tool link received together with the broadcast content, and receiving the tool. In all the above three cases where the user device connects to a broadcasting station server positioned at a remote place and downloads the tool, operations performed are almost the same. Therefore, only downloading from the tool server will be described in detail below. Alternatively, the tool or the tool link can be broadcast together with the content.

If the broadcasting station "A" decides to employ the new tool for its own permanent broadcasting service, first, it registers the new tool with the tool server. After that, processes of FIG. 6 are performed. The broadcasting station "A" broadcasts the new tool and related information together with the broadcast content for the logged-in (S210) user device 100 (S220). The user device 100 with the smart card 200 receiving the content performs a tool transmission request procedure. The tool transmission request procedure includes steps of determining a tool necessary for executing the received content (S230); determining whether or not the necessary tool is in the smart card 200 (S240); and connecting to the tool server 400 and requesting a tool not in the smart card 200 (S260).

The tool server 400 receiving the tool transmission request performs a procedure of tool transmission. The tool transmission procedure includes steps of verifying the smart card 200 (S270); and transmitting the tool for the broadcast content to the user device 100 (S280). After that, the user device 100 stores the received tool in the smart card 200 (S290), and executes the content using the newly introduced tool.

Scenario III. Transmission of Broadcast Content to Another STB

This scenario is as follows. A broadcasting station "A" allows the end users to transmit specific content (all or some) to another device (set-top-box) of a different domain. The broadcasting station "A" and a broadcasting station "B" use their own protection tools for content protection. It is assumed that the broadcasting stations "A" and "B" register their own protection tools with the tool server. A user "C" subscribes to the broadcasting station "A" and a user "D" subscribes to the broadcasting station "B". The user "C" desires to distribute the content of the broadcasting station "A" from his/her device (source device) to a device (target device) of a user "D". This scenario is different from a scenario described later in that content distribution is performed from a device registered as being of the user "C" to a device registered as being of the other user "D".

As shown in FIG. 7, a re-distribution method of the content stored in the source device of the user "C", which applies to this scenario, includes steps of checking whether or not the content intended to be re-distributed are permitted for re-distribution (S310); transmitting the content, use tool information, and a pointer of the broadcasting station to the target device (S320); in the target device, requesting the broadcasting station server for permission to execute the received content (S330); and receiving the execution permission (S335) and playing the content (S340).

The re-distribution permission checking step (S310) is performed such that a controller of the source device 100-1 checks the bibliographic information of the content data stored in an internal storage memory and confirms whether or not it indicates that the content is re-distributable. In order to prevent unlawful damage to the indication regarding permission, the bibliographic information is preferably encrypted. However, in the case where there is a procedure (e.g. S330 and S335 below) of checking with the broadcasting station whether or not re-distribution is again enabled in a subsequent process, the bibliographic information may not be encrypted.

In embodiments where re-distribution is more strictly regulated, after the re-distribution authority checking step (S310), a step of authenticating the target device 100-2 in the external broadcasting station server 300 may be further included. This is to realize a policy of permitting content re-distribution at least between users subscribing to the content broadcasting service of the present invention (that is, users subscribing to any one broadcasting station service). In order to more suitably apply this step, the content execution devices used in the broadcasting system of the present invention preferably have inherent identification values such as a media access code (MAC). In this embodiment, the content execution device can be identified using the inherent identification value (for example, a MAC value or an identification number allotted with application) of the smart card inserted into each content execution device. It is not desirable for the inherent identification values to be allotted to all of the content execution devices, because of a problem of compatibility with a conventional device and increase of a device manufacturing cost. It is desirable for the inherent identification values to be allotted to the smart cards so that devices are identified using the smart cards, because this makes application easy, cheap and convenient for users as well.

It is possible for the tool server of a tool registration/management center, not of the broadcasting station server 300, to perform user confirmation. Such an embodiment may be desirable because it easily allows the tool server to have information on all subscribers of all broadcasts provided according to the content broadcasting service according to the present invention.

The authenticating step of the target device 100-2 can include the steps of, in the source device 100-1, transmitting the identification value of the target device 100-2 to the tool server; in the tool server, searching a DB for the received identification value and determining whether or not the device corresponding to the identification value holds re-distribution authority; and transmitting the determination result to the target device 100-1.

In the step of transmitting the content/related information (S320), the related information transmitted from the source device to the target device can be information on the tool used for playing the transmission content, and a pointer (URL, link) of the broadcasting station having rights to the content intended to be transmitted. In the case where the related information is transmitted to a user who does not subscribe to a broadcasting copyright management system, it may be transmitted together with a pointer of the tool server.

In different embodiments, after the step of transmitting the content and related information (S320), a step of, in the target device 100-2, acquiring a needed tool from the tool server (not shown) may be further included. The tool acquiring step is omitted in cases where the target device 100-2 already has the tool, and where the necessary tool is transmitted together in the transmitting step of the content/related information. The target device 100-2 requests the tool server to transmit the necessary tool and downloads the necessary tool. In different embodiments, the requested tool server may transmit the tool to the target device 100-2 with a limit on the number of times the tool can be used.

The step of requesting content execution permission (S330) is performed such that the target device 100-2 requests the broadcasting station server 300 of the broadcasting station holding rights to the content for permission to execute the re-distributed content, through wired/wireless communication means. The broadcasting server 300 decides whether or not to issue permission from its own DB in consideration of information on a number of times the content has been re-distributed and a re-distribution limit and, upon decision to grant permission, prepares and transmits the permission with a specified range to the target device 100-2 (S335).

In the step of playing the content (S340), the target device 100-2 plays the re-distributed content using the received permission. The permission may be a software module having an electronic file format and may be unconditionally required for execution of the re-distributed content.

In another embodiment of a method of re-distributing content to another user's device (target device) with a structure of FIG. 8, the method of re-distributing content stored in a user "C" device (source device), applied to the scenario, includes steps of checking whether or not the content intended to be re-distributed are permitted for re-distribution (S410); receiving authentication of the target device 100-2 from the external tool server 400 (S420); transmitting the content, use tool information and play permission information to the target device 100-2 (S430); and playing the content in the target device 100-2 (S440).

The step of checking re-distribution permission (S410) can be performed such that a controller of the source device 100-1 checks the bibliographic information of the content data stored in an internal storage memory, and confirms whether or not it indicates that the content is re-distributable. In order to prevent unlawful damage to the indication regarding permission, the bibliographic information is preferably encrypted. However, in the case where there is a separate procedure of checking with the broadcasting station whether or not re-distribution is again possible in a subsequent process, the bibliographic information may not be encrypted.

The step of receiving authentication of the target device (S420) is included to realize a policy of permitting content re-distribution at least between users (that is, users subscribing to any one broadcasting station service) of the content broadcasting service of the present invention. In order to more suitably apply this step, the content execution devices used in the broadcasting system of the present invention preferably have inherent identification values such as a media access code (MAC). In this embodiment, the content execution device can be identified using the inherent identification value (for example, a MAC value or an identification number allotted with chip application) of the smart card inserted into each content execution device. It is not desirable for the inherent identification values to be allotted to all of the content execution devices, because of a problem of compatibility with a conventional device and increase of a device manufacturing cost. It is desirable for the inherent identification values to be allotted to the smart cards so that devices are identified using the smart cards, because this makes application easy, cheap and convenient for users as well.

The step of receiving authentication of the target device (S420) can include steps of in the source device 100-1, transmitting the identification value of the target device 100-2 to the tool server 400 and requesting authentication (S422); authenticating the target device 100-2 (S424); and transmitting the determination result to the source device 100-1.

In some embodiments, in the authenticating step (S424), the identification value of the target device may be searched for within the DB to perform offline authentication for determining whether or not the device having the identification value holds the authority for re-distribution, or connection with the broadcasting server (not shown) may be made to directly perform online authentication.

In the step of transmitting the content/related information (S430), some of the related information transmitted from the source device 100-1 to the target device 100-2 is information on the tool used for playing the transmission content. In some embodiments, the target device 100-2 may check whether or not it has the tool corresponding to the tool information, and if it doesn't, it may notify the source device 100-1 and receive the tool from the source device 100-1.

In the content playing step (S440), the target device 100-2 plays the received content using the necessary tool. Also in this step, in some embodiments, the target device 100-2 may play the re-distributed content using the received permission.

Scenario IV. Transmission of Broadcast Content to Other Multimedia Devices

This scenario is as follows. A broadcasting station "A" allows a user to play specific content (all or some) in its own portable device. The broadcasting station registers a tool for playing the portable-device with the tool server. The portable device generally has low performance in playing the broadcast content. Accordingly, the content requires conversion to a suitable resolution depending on specifications of the portable device. This constitutes conversion of content of literary work. A user "C" stores the broadcast content in the source device, and intends to play it in its own portable device (target device).

As shown in FIG. 9, a method of re-distributing the content stored in the device of the user "C", applied to this scenario, includes steps of: checking whether or not the content stored in the source device 100-1 are permitted for conversional re-distribution (S510); requesting the external tool server 400 to transmit a tool for the portable device (hereinafter, referred to as "portable tool"), and downloading the portable device tool (S520); requesting the broadcasting station server 300 for permission to perform altered retransmission to the target device 100-3, and receiving the permission (S530); transmitting the content, the portable tool, and the retransmission permission to the target device (S540); and in the target device (100-3), playing the content using the portable tool and the re-transmission permission (S550).

The step of checking for conversional re-distribution permission (S510) can be performed such that a controller of the source device 100-1 checks the bibliographic information of the content data stored in an internal storage memory and confirms whether or not it indicates that the content is alter-and-re-distributable. In order to prevent unlawful damage to the indication regarding permission, the bibliographic information is preferably encrypted.

After the step of checking for conversional re-distribution permission (S510), a step of confirming whether or not the target device 100-3 is a member of the same domain to which the source device 100-1 belongs can be further included. The purpose of this step is to apply a policy for permitting conversional re-distribution of content only between devices of the same user or devices belonging to any one of the service domains (e.g. a home domain). Here, in some embodiments, a list of devices (including portable devices) having the relationship may be registered with the broadcasting station server 300 or the tool server 400, and even with a user's main device (identified by the smart card and serving primarily to receive content from the broadcasting station server).

The step of downloading the portable tool (S520) is performed in the source device 100-1. This is because the source device 100-1 is easy to connect to the tool server 400 by means such as the Internet, whereas the target device 100-3 is mostly used in an offline state.

The step of requesting and receiving conversional re-distribution permission (S530) can include steps of, in the broadcasting server 300, searching the DB for the re-distribution policy and the user authority for the content, and determining whether or not portable transmission is permitted; upon decision regarding portable transmission permission, preparing portable transmission permission; and transmitting the prepared permission to the source device 100-1.

In the content transmission step (S540), the source device 100-1 transmits the content, the portable tool, and the portable permission to the target device 100-3 through a wired/wireless communication means (generally, a cable). When the same tool as the received portable tool is already stored in the internal storage memory, the target device 100-3 may receive only the content and the portable permission.

In the content playing step, the target device 100-3 executes the received content using the portable tool and the portable permission.

In some embodiments, the initially provided content in the source device 100-1 may be converted into portable content in the broadcasting station server or the target device 100-3. If the content is converted in the source device 100-1, less communication is required. In this case, the content transmitted from the source device 100-1 to the target device 100-3 is portable converted (that is, downsized) content data and the source device receives a downsizing tool from the broadcasting station server 300 or the tool server 400 and converts the content.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A content execution device comprising:
   a smart card issued to a user that subscribes to one of at least one or more broadcasting station servers,
   wherein the smart card configured to have a tool storage unit for storing at least one tool program for encoding or decoding content data to be received from the subscribed broadcasting station server;
   an authority storage unit for storing authority information on the subscribed broadcasting station server; and
   an authentication module having a security key corresponding to a security key of the subscribed broadcasting station server to perform mutual authentication with the subscribed broadcasting station server when the smart card is inserted into the content execution device;
   a tool agent configured to call the at least one tool program from the smart card and authorize the called tool program to encode or decode the content data; and
   a content execution unit configured to play the content data received from the subscribed broadcasting station server by activating the tool agent, whereby the tool agent calls and authorizes the tool program to encode or decode the content data for playing, and
   wherein since the tool program is called by only the tool agent, a call interface, a parameter and a return variable for the tool program are protected in private for security.

2. The content execution device of claim 1, further comprising an authentication support module for providing a data communication channel between the smart card and the broadcasting station server.

3. A method for re-distributing content data received from a broadcasting station server and stored in a source device to a target device, the method comprising: determining, at the source device, whether or not re-distribution of the content data is permitted by checking bibliographic information of the content data; re-distributing, at the source device, the content data, information on at least one tool used to play the content data and an URL of the broadcasting station server from which the content data is received, to the target device; requesting permission to play the content data from the target device to the broadcasting station server; and determining, at the broadcasting server, whether or not to issue permission based on information on re-distribution number and maximum limit of re-distribution of the content data, granting the permission based on the determination result and the permission to the target device; acquiring, at the target device, at least one tool program used to encode or decode content data from the tool server; and receiving, at the target device, the permission and playing the content data.

4. The method for re-distributing content of claim 3, after determining whether or not re-distribution of the content data is permitted, further comprising authenticating the target device from a tool server.

5. The method for re-distributing content of claim 4, wherein the authenticating comprises:
   determining, at the tool server, whether or not the target device has been authorized to receive the content data to be re-distributed by the source device by searching a DB for the received identification value; and
   transmitting the determination result to the source device.

6. A method for re-distributing content data received from a broadcasting station server and stored in a source device to a portable target device, the method comprising:
- determining, at the source device, whether or not re-distribution of the content data is permitted by checking bibliographic information of the content data;
- determining, at the source device, whether or not the portable target device belongs to the same domain to which the source device belongs;
- downloading, at the source device, at least one tool program used to encode or decode the content data at the portable target device, from a tool server;
- requesting permission to re-distribute the content data from the source device to the broadcasting station server;
- in response to the permission to re-distribute the content data from the broadcasting station server, re-distributing, at the source device, the content data, the at least one tool program and the permission to re-distribute, to the target device; and
- receiving, at the target device, the content data, the at least one tool program and the permission and playing the content data using the at least one tool program and the permission.

7. The method for re-distributing content of claim 6, after determining whether or not re-distribution of the content data is permitted, further comprising confirming whether or not the target device is a member of the same domain to which the source device belongs.

* * * * *